(12) United States Patent
Kang et al.

(10) Patent No.: US 12,477,203 B2
(45) Date of Patent: Nov. 18, 2025

(54) METHOD AND APPARATUS WITH IMAGE QUALITY IMPROVEMENT

(71) Applicants: Samsung Electronics Co., Ltd., Suwon-si (KR); CARNEGIE MELLON UNIVERSITY, Pittsburgh, PA (US)

(72) Inventors: Eunhee Kang, Suwon-si (KR); Anqi Yang, Pittsburgh, PA (US); Aswin Sankaranarayanan, Pittsburgh, PA (US); Hyong Euk Lee, Suwon-si (KR)

(73) Assignees: Samsung Electronics Co., Ltd., Suwon-si (KR); CARNEGIE MELLON UNIVERSITY, Pittsburgh, PA (US)

( * ) Notice: Subject to any disclaimer, the term of this patent is extended or adjusted under 35 U.S.C. 154(b) by 201 days.

(21) Appl. No.: 18/333,920

(22) Filed: Jun. 13, 2023

(65) Prior Publication Data

US 2023/0403455 A1    Dec. 14, 2023

Related U.S. Application Data

(60) Provisional application No. 63/448,574, filed on Feb. 27, 2023, provisional application No. 63/351,646, filed on Jun. 13, 2022.

(30) Foreign Application Priority Data

Jul. 15, 2022    (KR) .......................... 10-2022-0087564
May 24, 2023   (KR) .......................... 10-2023-0067206

(51) Int. Cl.
*H04N 23/55*    (2023.01)
*G02B 26/06*    (2006.01)

(52) U.S. Cl.
CPC ............. *H04N 23/55* (2023.01); *G02B 26/06* (2013.01)

(58) Field of Classification Search
CPC ........ H04N 23/55; H04N 23/80; H04N 23/57; G02B 26/06; G06T 5/60; G06T 5/73; G06T 2207/20084
See application file for complete search history.

(56) References Cited

U.S. PATENT DOCUMENTS 7,936,987 B2    5/2011   Park et al.
9,336,582 B1    5/2016   Barron
(Continued)

FOREIGN PATENT DOCUMENTS

CN    110099201 A    8/2019
CN    112132098 A    12/2020
(Continued)

OTHER PUBLICATIONS

Yang, Qirui, et al. "Residual and dense unet for under-display camera restoration." *European Conference on Computer Vision.* Cham: Springer International Publishing, 2020.
(Continued)

*Primary Examiner* — Shahbaz Nazrul
(74) *Attorney, Agent, or Firm* — NSIP Law

(57) ABSTRACT

A device with image acquisition includes: a first phase mask disposed at a front end of a display layer and configured to modulate external light; the display layer comprising pixel areas between hole areas through which the modulated light that has passed through the first phase mask passes; a second phase mask disposed at a rear end of the display layer and configured to modulate the modulated light that has passed through the first phase mask; an image sensor disposed at a rear end of the second phase mask and configured to generate a raw image by sensing the modulated light that has (Continued)

passed through the second phase mask; and a processor configured to perform image processing on the raw image, based on blur information corresponding to the raw image.

29 Claims, 19 Drawing Sheets

(56) References Cited

U.S. PATENT DOCUMENTS

| | | | |
|---|---|---|---|
| 9,826,149 B2 | 11/2017 | Chalom et al. | |
| 10,289,951 B2 | 5/2019 | Wang et al. | |
| 10,460,231 B2 | 10/2019 | Zhang et al. | |
| 10,593,021 B1 | 3/2020 | Shen et al. | |
| 10,869,028 B2 | 12/2020 | Heo et al. | |
| 11,272,106 B1 | 3/2022 | Lee et al. | |
| 2017/0070671 A1 | 3/2017 | Cho | |
| 2019/0215438 A1 | 7/2019 | Lee et al. | |
| 2020/0389575 A1* | 12/2020 | Gove | H04N 13/271 |
| 2020/0407082 A1* | 12/2020 | Ashrafi | H04B 10/508 |
| 2021/0029336 A1* | 1/2021 | Liu | H04N 25/615 |
| 2021/0364830 A1* | 11/2021 | Wang | G02F 1/1676 |
| 2021/0385360 A1 | 12/2021 | Wang et al. | |

FOREIGN PATENT DOCUMENTS

| | | |
|---|---|---|
| CN | 112163501 A | 1/2021 |
| EP | 3 780 576 A1 | 2/2021 |
| EP | 3 513 550 B1 | 4/2022 |
| KR | 10-2022-0021728 A | 2/2022 |

OTHER PUBLICATIONS

Yang, Angi, and Aswin C. Sankaranarayanan. "Designing Phase Masks for Under-Panel Cameras." *ACM Trans. Graph.* vol. 37, No. 4 (Aug. 2018).

Anonymous ICCV submission. "Designing Phase Masks for Under-Display Cameras." ICCV. Paper ID 4436. 2023.

Anonymous ICCV submission. "Designing Phase Masks for Under-Display Cameras: supplementary material." ICCV. Paper ID 4436. 2023.

Zhou, Yuqian, et al. "Image Restoration for Under-Display Camera." Proceedings of the IEEE/CVF Conference on Computer Vision and Pattern Recognition. zrXiv:2003.04857v1 [cs.CV] Mar. 10, 2020, (17 pages).

Extended European search report issued on Oct. 23, 2023, in counterpart European Patent Application No. 23179052.8 (9 pages).

Wu, Yicheng, et al. "Phasecam3d-learning phase masks for passive single view depth estimation." 2019 IEEE International Conference on Computational Photography (ICCP). IEEE, May 15, 2019. (pp. 1-12).

Yang, Anqi, et al. "Designing Phase Masks for Under-Display Cameras." Proceedings of the IEEE/CVF International Conference on Computer Vision, Jan. 2024. (pp. 10637-10645).

* cited by examiner

METHOD AND APPARATUS WITH IMAGE QUALITY IMPROVEMENT

CROSS-REFERENCE TO RELATED APPLICATIONS

This application claims the benefit under 35 U.S.C. § 119(e) of U.S. Provisional Application No. 63/351,646 filed on Jun. 13, 2022 and U.S. Provisional Application No. 63/448,574 filed on Feb. 27, 2023, filed in the U.S. Patent and Trademark Office, and claims the benefit under U.S.C. § 119(a) of Korean Patent Application No. 10-2022-0087564 filed on Jul. 15, 2022 and Korean Patent Application No. 10-2023-0067206 filed on May 24, 2023, filed in the Korean Intellectual Property Office, the entire disclosures of which are incorporated herein by reference for all purposes.

BACKGROUND

1. Field

The following description relates to a method and device with image quality improvement.

2. Description of Related Art

A camera, a device for capturing an image, may be used for various electronic devices. For a mobile device, such as a smartphone, a camera may be an essential component, and may be highly advanced in terms of its performance and small size. Typically, a smartphone may include a front camera and a rear camera. The front camera may be arranged on an upper area of the smartphone and may be widely used for capturing a selfie.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, a device with image acquisition includes: a first phase mask disposed at a front end of a display layer and configured to modulate external light; the display layer comprising pixel areas between hole areas through which the modulated light that has passed through the first phase mask passes; a second phase mask disposed at a rear end of the display layer and configured to modulate the modulated light that has passed through the first phase mask; an image sensor disposed at a rear end of the second phase mask and configured to generate a raw image by sensing the modulated light that has passed through the second phase mask; and a processor configured to perform image processing on the raw image, based on blur information corresponding to the raw image.

For the modulating of the external light, the first phase mask may be configured to modulate the external light such that the external light converges and diffuses in the hole areas, and for the modulating of the modulated light, the second phase mask may be configured to modulate the diffused light to correspond to the external light.

The second phase mask may be configured to modulate the diffused light to a plane wave.

The first phase mask and the second phase mask may have a same focal length, the first phase mask may be disposed at a position apart from the front end of the display layer by the focal distance, and the second phase mask may be disposed at a position apart from the rear end of the display layer by the focal distance.

The first phase mask and the second phase mask may be included in a microlens array.

Either one or both of the first phase mask and the second phase mask may include a polarization dependent phase mask.

A height profile of the first phase mask and the second phase mask may be determined based on each of a plurality of pixels comprising the pixel regions.

Invertibility of the raw image may be determined based on any one or any combination of any two or more of a pixel pitch of the display layer, a thickness of the first phase mask and the second phase mask, and a lens pitch of the first phase mask and the second phase mask.

The invertibility of the raw image may be configured to increase in response to any one or any combination of any two or more of an increase in the pixel pitch of the display layer, a decrease in the thickness of the first phase mask and the second phase mask, and an increase in the lens pitch of the first phase mask and the second phase mask.

The processor may be configured to perform the image processing on the raw image based on blur information for each pixel of the image sensor.

The blur information for each pixel may include either one or both of position information of a main lobe of a point spread function (PSF) corresponding to each pixel of the image sensor and an intensity of the main lobe.

For the performing of the image processing, the processor may be configured to generate an enhanced image using an image restoration model based on a neural network, and the image restoration model may be configured to receive data determined by concatenating the raw image and the blur information for each pixel.

The image restoration model may include an attention block, and for the obtaining of the enhanced image, the processor may be configured to use a kernel-guide map generated based on the blur information for each pixel as the attention block.

The blur information may include information on blur of the raw image determined based on any one or any combination of any two or more of a size, a shape, a depth, and an arrangement of the hole areas.

The blur information may include information on a point spread function (PSF) based on an arrangement structure of the hole areas.

In one or more general aspects, a device with image acquisition includes: a display layer comprising hole areas through which external light passes and pixel areas between the hole areas; a multiple phase mask under the display layer and configured to diffuse the external light that has passed through the hole areas and to modulate the diffused light to correspond to the external light; and an image sensor under the multiple phase mask and configured to generate a raw image by sensing modulated light that has passed through the multiple phase mask.

For the modulating of the diffused light, the multiple phase mask may be configured to modulate the diffused light to a plane wave.

Invertibility of the raw image may be determined based on any one or any combination of any two or more of a pixel pitch of the display layer, a thickness of the multiple phase mask, and a lens pitch of the multiple phase mask.

In one or more general aspects, a device with image acquisition includes: a first phase mask disposed at a front end of a display layer and configured to modulate external light; a second phase mask disposed at a rear end of the display layer and configured to modulate the light that has passed through the first phase mask; an image sensor disposed at a rear end of the second phase mask and configured to generate a raw image by sensing the modulated light that has passed through the second phase mask.

In one or more general aspects, a method with image acquisition includes: modulating, using a first phase mask disposed at a front end of a display layer, an external light; modulating, using a second phase mask disposed at a rear end of the display layer, the modulated light that has passed through the first phase mask; generating, using an image sensor disposed at a rear end of the second phase mask, a raw image by sensing the modulated light that has passed through the second phase mask; and performing, using a processor, image processing on the raw image, based on blur information corresponding to the raw image.

The modulating of the external light may include modulating, using the first phase mask, the external light such that the external light converges and diffuses in a hole area of the display layer, and the modulating of the modulated light may include modulating, using the second phase mask, the diffused light to correspond to the external light.

In one or more general aspects, a non-transitory computer-readable storage medium stores instructions that, when executed by a processor, configure the processor to perform any one, any combination, or all of operations and/or methods described herein.

In one or more general aspects, a device with image acquisition includes: a display layer comprising hole areas through which external light passes and pixel areas between the hole areas; a multiple phase mask under the display layer and configured to modulate the external light that has passed through the hole areas; an image sensor under the multiple phase mask and configured to generate a raw image by sensing the modulated light that has passed through the multiple phase mask; and a processor configured to perform image processing on the raw image, based on blur information corresponding to the raw image.

Other features and aspects will be apparent from the following detailed description, the drawings, and the claims.

Figure 1:
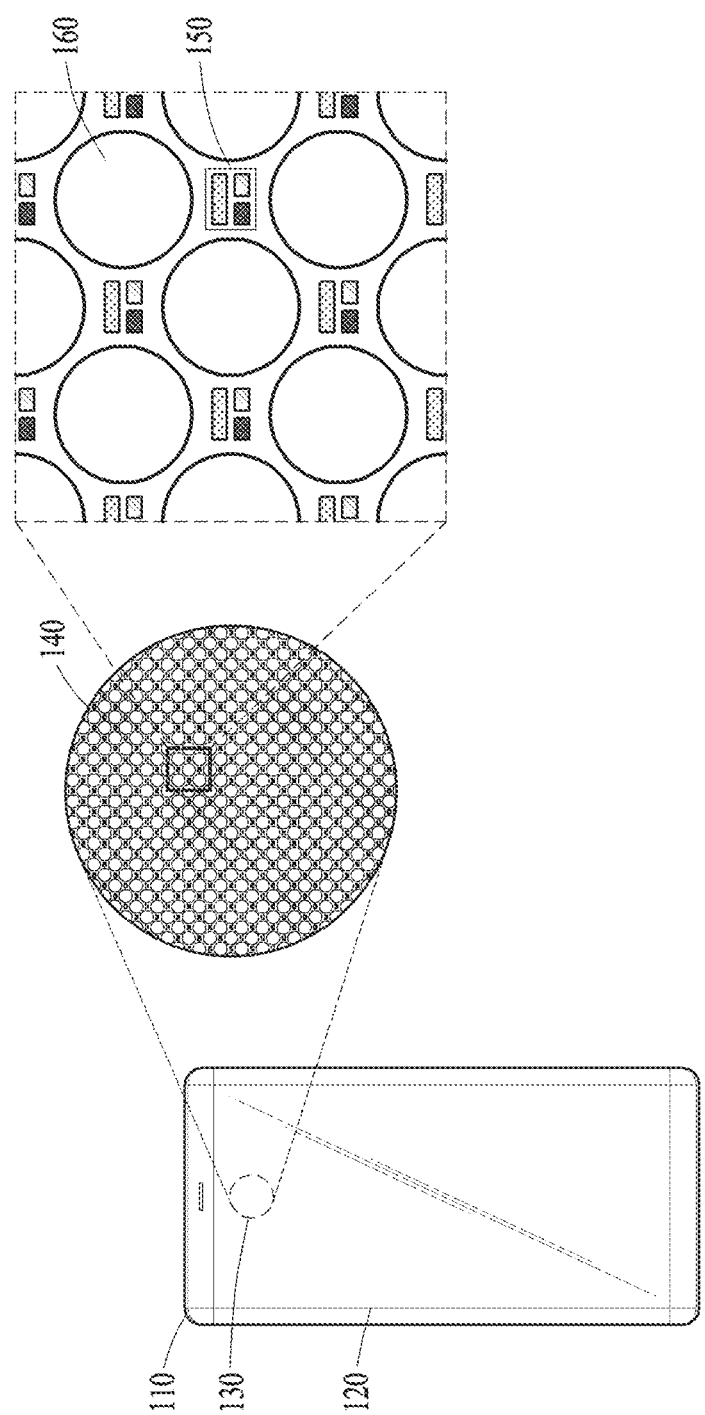
FIG. 1 illustrates an electronic device to which an image acquisition device is applied and an enlarged capture area on a display screen according to one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, devices, and/or systems described herein. However, various changes, modifications, and equivalents of the methods, devices, and/or systems described herein will be apparent after an understanding of the disclosure of this application. For example, the sequences of operations described herein are merely examples, and are not limited to those set forth herein, but may be changed with the exception of operations necessarily occurring in a certain order. Also, descriptions of features that are known after understanding of the disclosure of this application may be omitted for increased clarity and conciseness.

Although terms of "first," "second," and "third" may be used to describe various components, members, regions, layers, or sections, these components, members, regions, layers, or sections are not to be limited by these terms (e.g., "first," "second," and "third"). Rather, these terms are only used to distinguish one component, member, region, layer, or section from another component, member, region, layer, or section. Thus, for example, a "first" component, member, region, layer, or section referred to in examples described herein may also be referred to as a "second" component, member, region, layer, or section, and a "second" component, member, region, layer, or section referred to in examples described herein may also be referred to as the "first" component without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween. Likewise, similar expressions, for example, "between" and "immediately between," and "adjacent to" and "immediately adjacent to," are also to be construed in the same.

The singular forms "a", "an", and "the" are intended to include the plural forms as well, unless the context clearly indicates otherwise. It should be further understood that the terms "comprises/comprising" and/or "includes/including," when used in this specification, specify the presence of stated features, integers, steps, operations, elements, components, and/or combinations thereof, but do not preclude the presence or addition of one or more other features, integers, steps, operations, elements, components, and/or combinations thereof. As used herein, the term "and/or" includes any one and any combination of any two or more of the associated listed items. The use of the term "may" herein with respect to an example or embodiment (for example, as to what an example or embodiment may include or implement) means that one or more examples or embodiments exists where such a feature is included or implemented, while all examples are not limited thereto.

Unless otherwise defined, all terms used herein including technical or scientific terms have the same meaning as commonly understood by one of ordinary skill in the art to which examples belong and based on an understanding of the disclosure of the present application. It will be further understood that terms, such as those defined in commonly-used dictionaries, should be interpreted as having a meaning that is consistent with their meaning in the context of the relevant art and the disclosure of the present application, and will not be interpreted in an idealized or overly formal sense unless expressly so defined herein.

The examples may be implemented as various types of devices, such as, for example, a personal computer (PC), a laptop computer, a tablet computer, a smart phone, a television (TV), a smart home appliance, an intelligent vehicle, a kiosk, and/or a wearable device. Hereinafter, examples will be described in detail with reference to the accompanying drawings. In the drawings, like reference numerals are used for like elements.

FIG. 1 illustrates an electronic device to which an image acquisition device is applied and an enlarged capture area on a display screen, according to one or more embodiments.

Referring to FIG. 1, the image acquisition device may be a device for acquiring image data by capturing an image and may be embedded in an electronic device 110, such as a smartphone, a tablet computer, a wearable device, a netbook, a laptop, a personal digital assistant (PDA), and/or a smart home device. The image acquisition device may be embedded, without limitation, in the electronic device 110 that includes a display 120.

A camera that receives external light in the image acquisition device may not be exposed to the outside and may be arranged (e.g., disposed) inside the electronic device 110. The camera of the image acquisition device may be arranged under the display 120 of the electronic device 110 and the image acquisition device with this arrangement may be referred to as an under display camera (UDC). When the camera is arranged inside the electronic device 110, an area in which the camera is arranged may also be implemented as a display area. Through this, for maximizing the size of the display area, a display may be completely implemented in a rectangular shape without implementing the shape of the display in a notch shape or providing an independent area for the camera in the display area.

When an image sensor is arranged inside (e.g., disposed below) an area 130 of the display 120, a display layer 140 corresponding to the area 130 may include hole areas 160 in circular shapes and pixel areas 150. However, the shapes of the hole areas 160 are not limited to the circular shape and the hole areas 160 may be implemented as various shapes, such as an oval or a square, as non-limiting examples. Herein, the hole area 160 may be referred to as a micro-hole area. An arrangement pattern of the pixel areas 150 and the hole areas 160 may be repeated in the display layer 140 corresponding to the area 130. In one or more embodiments, each of the hole areas 160 may be arranged between the pixel areas 150 and maximally adjacent to the pixel areas 150.

The image acquisition device may obtain image data based on external light passing through the hole areas 160 of the display layer 140. An image may output through the pixel areas 150, like pixel areas included in other areas of the display 120. The display layer 140 may be a component constituting a display panel and may correspond to a layer in which the pixel areas 150 are arranged. In one or more embodiments, the hole areas 160 may be provided only in the area 130 in which the image acquisition device is arranged, wherein the hole areas 160 may be configured to pass, to the inside the electronic device 110, external light entering the area 130 of the display layer 140. Although the shape of the area 130 and the shape of the display layer 140 in which the hole areas 150 is arranged are illustrated in a circular shape in the drawings, this is merely a non-limiting example, and the shapes of the area 130 and the display layer 140 may be implemented in various other shapes according to other non-limiting examples.

Figure 2A:
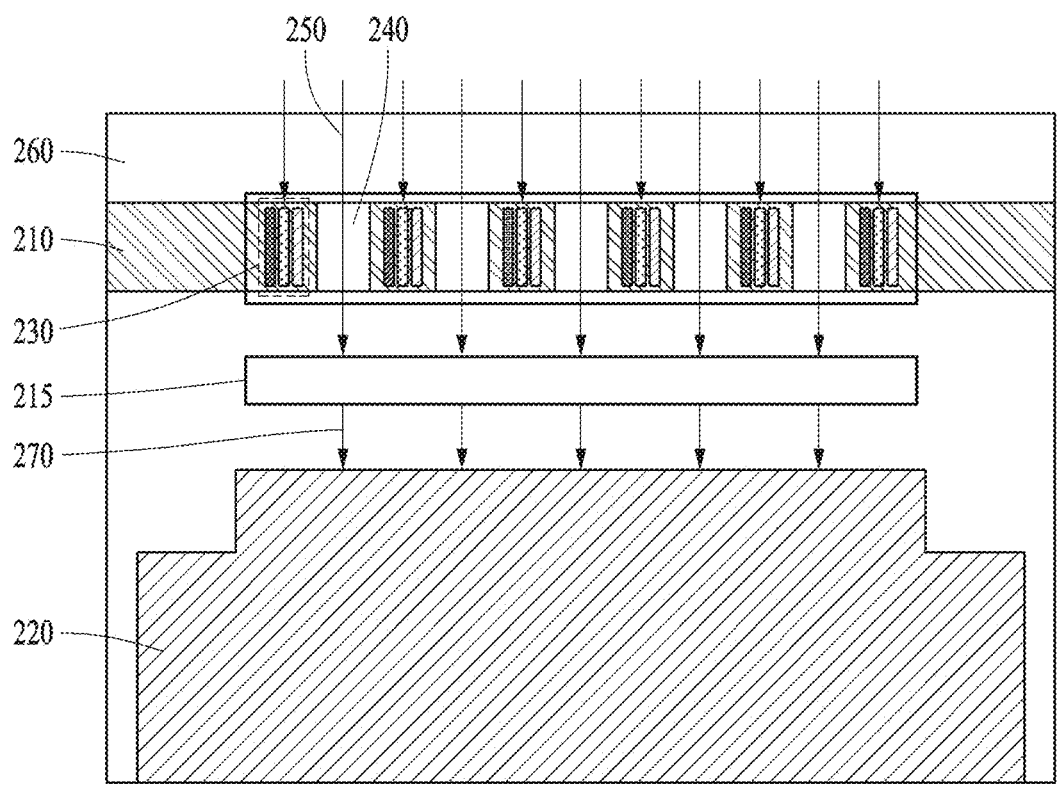
FIG. 2A illustrates a structure of an image acquisition device according to one or more embodiments.

FIG. 2A illustrates a structure of an image acquisition device according to one or more embodiments.

FIG. 2A illustrates an example of a cross-section viewing from the area 130 of the electronic device 110 in an inward direction. An image acquisition device may include a display layer 210, a multiple phase mask 215, and an image sensor 220. The display layer 210 may include pixel areas 230 configured to output a color and hole areas 240 in a circular or cylindrical shape configured to pass external light 250. The pixel areas 230 and the hole areas 240 may be alternately arranged on the display area 210. When other areas except for the hole areas 240 in the display layer 210 are closed, the external light may reach the image sensor 220 by passing through the hole areas 240 only.

A protective layer 260 including a transparent material may be provided on the display layer 210 to protect the display layer 210. The protective layer 260 may include, for example, tempered glass and/or tempered plastic. In addition, the display layer 210 may include other components other than the pixel areas 230 for implementing a display panel. A display through the pixel areas 230 may be implemented in a display type, such as a liquid crystal display (LCD) and an organic light-emitting diode (OLED).

The multiple phase mask 215 may be under the display layer 210 and may modulate the external light 250 passing through the hole areas 240. However, examples are not limited thereto, and in another non-limiting example, the multiple phase mask 215 may be disposed above the display layer 210. For example, the multiple phase mask 215 may be included in the protective layer 260 or may be between the protective layer 260 and the display layer 210. Further, in another non-limiting example, the multiple phase mask 215 may be included in the display layer 210 such that each of a plurality of microlenses of the multiple phase mask 215 is disposed in a respective hole area of the hole areas 240.

The image sensor 220 may be under the multiple phase mask 215 and may generate a raw image by sensing modulated light 270 that has passed through the multiple phase mask 215. The image sensor 220 may include a camera lens configured to generate image data by receiving external light (e.g., the modulated light 270) and a sensor configured to convert, into an electrical image signal, light that enters through the camera lens. The image sensor 220 may be micro-sized and a plurality of image sensors may be provided according to one or more embodiments. The raw image may be an image generated by sensing light entering the hole areas 240 by the image sensor 220 and may include, for example, a demosaiced red, green, blue (RGB) image.

For a typical image acquisition device that does not include the multiple phase mask 215, of light that enters the display layer 210, only a portion of the light passing through the hole areas 240 may reach the image sensor 220, and thus, the raw image obtained by the image sensor 220 may have a lower level of image quality than a desired level. For example, by occluding the pixel areas 230, the raw image may have relatively low brightness and a lot of noise may be shown in the raw image. In addition, artifacts due to an effect of diffraction may be shown in the raw image when the hole areas 240 function as a slit. For example, blur or flare may appear on the raw image.

The image acquisition device of one or more embodiments may obtain an enhanced raw image in a structure, such as the UDC, compared to the typical image acquisition device including the image quality degradation element as described above.

The image acquisition device of one or more embodiments may include the multiple phase mask 215 for obtaining an enhanced raw image. The multiple phase mask 215 may be configured with a plurality of phase masks and each of the phase masks may modulate a wavefront of the external light 250 to be in a desired profile (e.g., the size and shape) by sequentially refracting the external light 250 that has passed through the hole areas 240. The phase masks constituting the multiple phase mask 215 may include a single-sided phase mask and a double-sided phase mask (e.g., a double-sided microlens array).

Furthermore, in the structure such as the UDC, the image acquisition device of one or more embodiments may perform image processing to additionally enhance the obtained enhanced raw image. The image acquisition device may further include a processor (a processor 1030 of FIG. 10 and/or a processor 1110 of FIG. 11, as non-limiting examples) configured to perform the image processing described above. In one or more embodiments, the image processing may be performed by the image sensor. The image processing may include a process of restoring the raw image obtained by the image sensor 220 such that the raw image may have a similar image quality to a typical image that is captured by a camera in a typical environment. The image acquisition device of one or more embodiments may effectively perform image restoration through an image processing process considering blur information for each pixel of the image sensor 220 and arrangement (e.g., a shape, form, and/or size) of the hole areas 240 and may provide a high-quality clear image in the UDC environment.

Figure 2B:
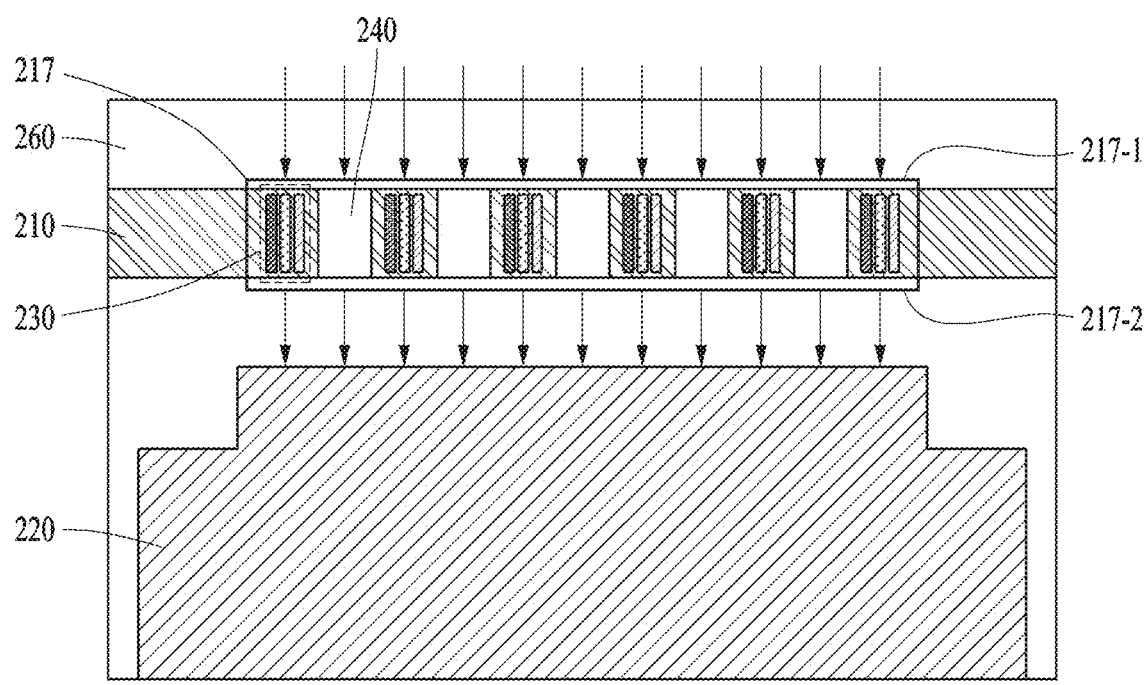
FIG. 2B illustrates a structure of an image acquisition device according to one or more embodiments.

FIG. 2B illustrates a structure of an image acquisition device according to one or more embodiments.

FIG. 2B illustrates an example of a cross-sectional section viewing from the area 130 of the electronic device 110 in an inward direction. A first phase mask 217-1 of a multiple phase mask 217 is disposed at a front end of the display layer 210 (e.g., the first phase mask 217-1 is disposed above the display layer 210) to modulate the external light 250, a second phase mask 217-2 of the multiple phase mask 217 is disposed at a rear end of the display layer 210 (e.g., the second phase mask 217-2 is disposed below the display layer 210) to modulate light that has passed through the first phase mask 217-1, and the image sensor 220 is disposed at a rear end of the second phase mask 217-2 (e.g., the image sensor 220 is disposed below the second phase mask 217-2).

The external light may be diffused after converging in the hole areas 240 after passing through the first phase mask 217-1, and the second phase mask 217-2 may modulate the diffused light to correspond to the external light. In this way, the size of the hole areas 240 of the display layer 210 may be optically expanded. Further, in a non-limiting example, either one or both of the first phase mask 217-1 and the second phase mask 217-2 may be or include a polarization-dependent phase mask.

Figure 3A:
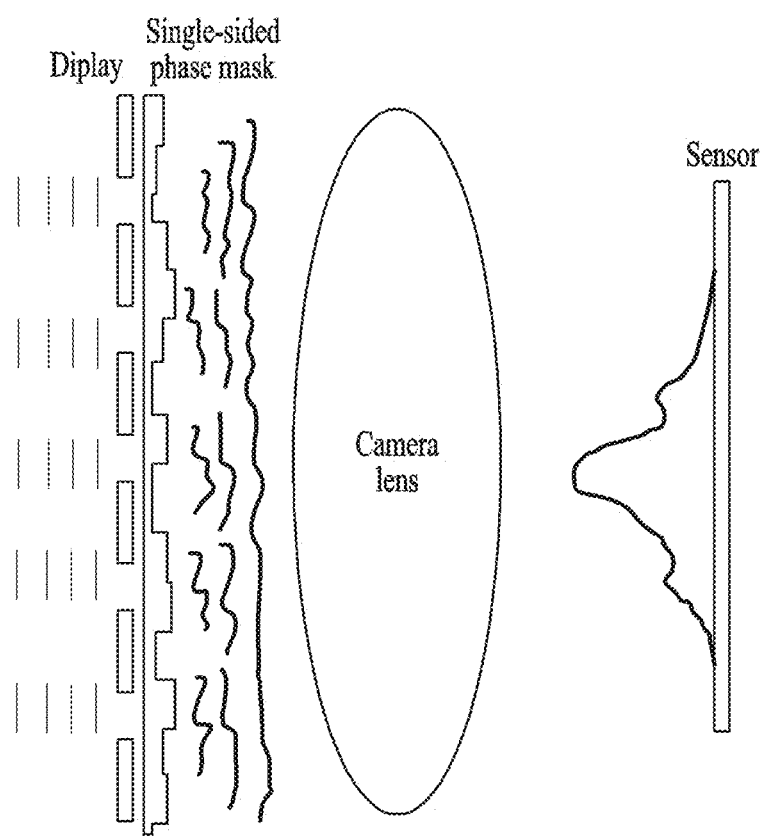
FIGS. 3A to 3C illustrate a modulation method using a multiple phase mask phase mask according to one or more embodiments.
Figure 3B:
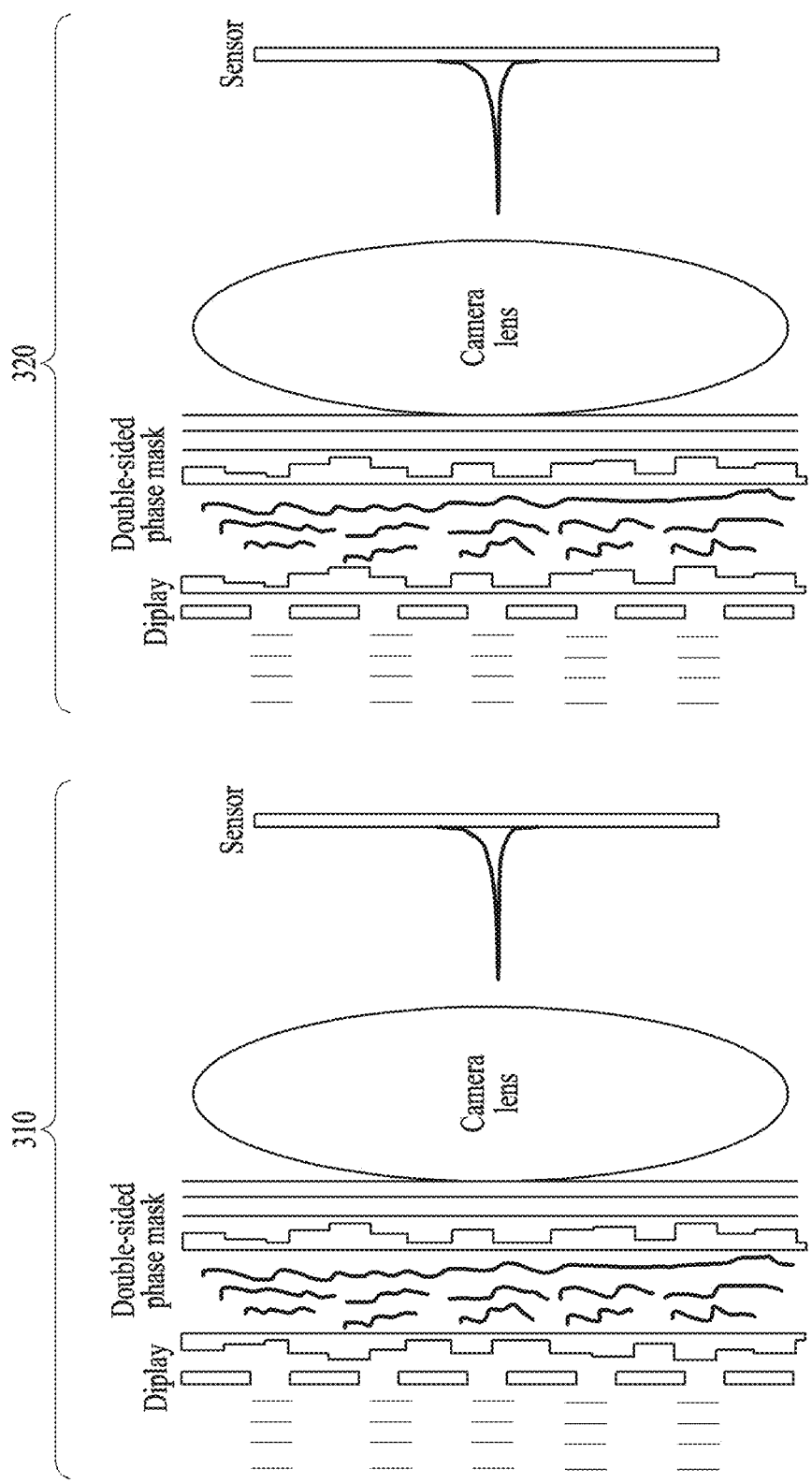
Figure 3C:
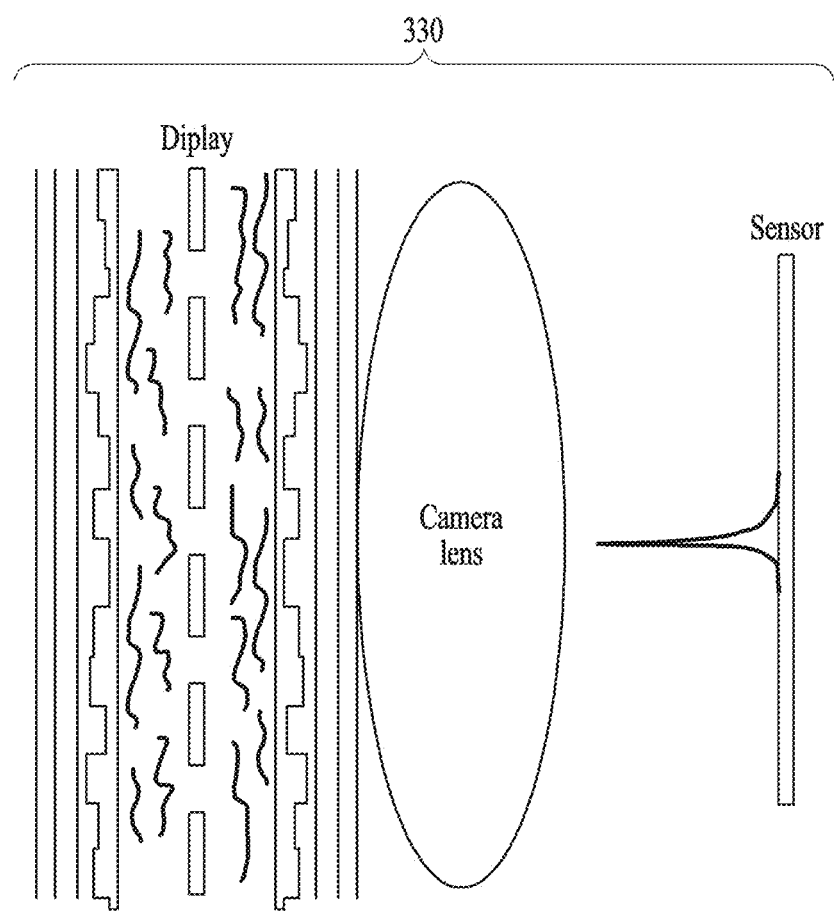

FIGS. 3A to 3C illustrate a modulation method using a multiple phase mask according to one or more embodiments.

A limitation of a typical modulation method using a single-sided phase mask is described with reference to FIG. 3A before describing a modulation method of one or more embodiments using a multiple phase mask with reference to FIG. 3B.

Referring to FIG. 3A, a single-sided phase mask may be disposed between a display layer and an image sensor and may modulate external light that has passed through hole areas. However, the single-sided phase mask may not modulate the external light in a desired form when the single-sided phase mask modulates the external light using only one phase mask.

Referring to FIG. 3B, an image acquisition device according to one or more embodiments may be configured to diffuse external light to form a plane wave by using the multiple phase mask (the double-sided phase mask, as a non-limiting example), and the image sensor may generate a raw image by sensing modulated light that may be advantageous to image restoration as the modulated light includes sufficient information. For example, image quality degradation of a raw image obtained by the UDC system may occur because of a hole area that is a similar size to a wavelength of incident light entering the display layer. Accordingly, the image acquisition device of one or more embodiments may virtually expand the size of the hole area by modulating, using the multiple phase mask, the external light before the external light reaches the image sensor. For ease of description, the description herein is provided based on the double-sided phase mask. However, the description is not limited to the double-sided phase mask, and the multiple phase mask may include three or more phase masks, according to other non-limiting examples.

Referring to FIG. 3B, the double-sided phase mask may include two single-sided phase masks. Referring to a diagram 310 in the drawings, the double-sided phase mask may include two single-sided phase masks of which phase adjustment surfaces are oriented in an opposite direction to each other. Referring to a diagram 320, the double-sided phase mask may include two single-sided phase masks of which phase adjustment surfaces are oriented in the same direction.

Referring to FIG. 3C, a first phase mask of the double-sided phase masks may be disposed at a front end of the display layer (e.g., the first phase mask may be disposed facing a front or display side of the display layer, and/or disposed above the display layer), a second phase mask of the double-sided phase masks may be disposed at a rear end of the display layer (e.g., the second phase mask may be disposed facing a back or back side of the display layer, and/or disposed below the display layer), and the image sensor may be disposed at a rear end of the second phase mask (e.g., the image sensor may be disposed below the second phase mask).

The external light incident in the form of a plane wave may be incident on the first phase mask and not reach the pixel areas of the display layer, converge in the hole areas, and then diffuse. The diffused light may then be incident on the second phase mask, refracted, and output as a plane wave corresponding to the external light.

When using a first phase mask and a second phase mask of fixed height, chromatic aberration may occur. Accordingly, the height profile of the first phase mask and the second phase mask (e.g., the height profile of each of the first phase mask and the second phase mask or the height profile the first phase mask and the second phase mask combined) may be determined based on each of the plurality of pixels comprising the pixel areas. The height profile of the first phase mask and the second phase mask (the height profile may also be referred to as a height map, for example) may be determined to minimize chromatic aberration and maximize the reversibility of the point spread function (PSF) corresponding to each pixel of the image sensor. Further, in a non-limiting example, either one or both of the first phase mask and the second phase mask may be or include a polarization-dependent phase mask.

Figure 4A:
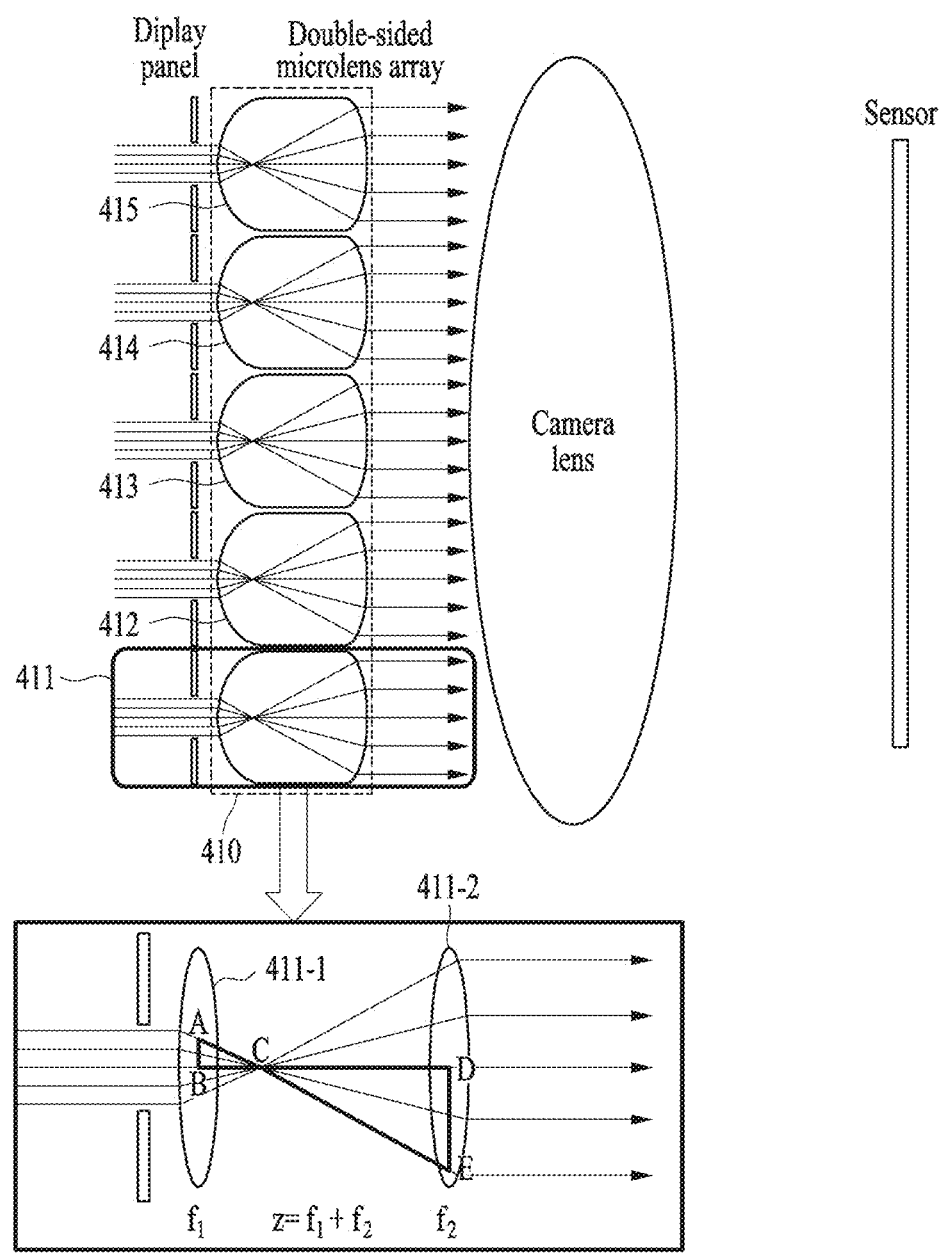
FIG. 4A illustrates an operation of a multiple phase mask when external light perpendicularly enters a display layer according to one or more embodiments.

FIG. 4A illustrates an operation of a multiple phase mask when external light perpendicularly enters a display layer according to one or more embodiments.

Referring to FIG. 4A, a microlens array (MLA) 410 may be used as a multiple phase mask according to one or more embodiments.

A plurality of microlenses 411 to 415 may be arranged in the MLA 410 and each of the microlenses 411 to 415 may function as a double-sided phase mask.

To describe based on the microlens 411, the microlens 411 may include a first lens 411-1 and a second lens 411-2. The first lens 411-1 may diffuse external light that has passed through hole areas to spread in a predetermined distance and may expand external light such that a wavefront of the external light may have an intensity that is not a predetermined value (e.g., "0") over the entire aperture area. The second lens 411-2 may modulate the light diffused through the first lens 411-1 to correspond to the external light. For example, the second lens 411-2 may modulate the light diffused through the first lens 411-1 to a plane wave.

For example, the image acquisition device according to one or more embodiments may offset image quality degradation due to the display layer by modulating, using the microlens 411, light input to the image sensor in the UDC system into the form of light that is input to a typical camera system.

For example, the first lens 411-1 of the microlens 411 may have a focal length of $f_1$ and the second lens 411-2 may have a focal length of $f_2$. In this case, the thickness of the microlens 411 may be $f_1+f_2$. The first lens 411-1 may concentrate external light that has passed through the hole areas in the focus of the second lens 411-2 and the second lens 411-2 may modulate the concentrated external light to a parallel beam.

When the width of light entering the first lens 411-1 is AB and the width of light entering the second lens 411-2 is CD, magnification of the microlens 411 may be expressed by Equation 1 shown below, for example.

$$M = \frac{CD}{AB} = \frac{f_2}{f_1}. \qquad \text{Equation 1}$$

According to Equation 1, when $f_2=M*f_1$ and the thickness of the microlenses 411 is $z=f_1+f_2$, a ratio of light expansion may be determined based on Equation 1 and the thickness of the microlens 411.

Figure 4B:
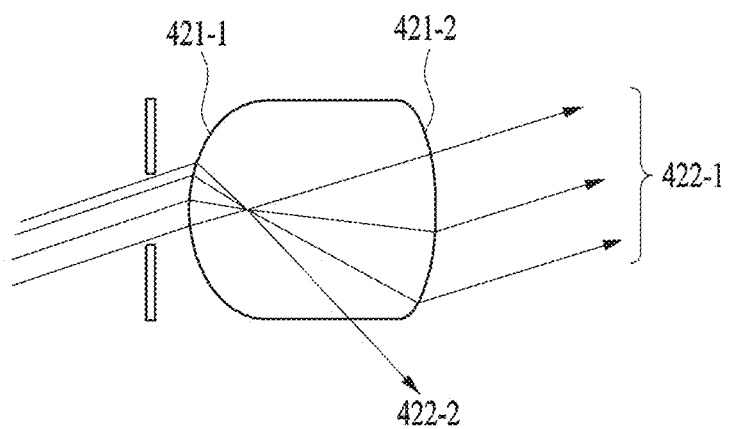
FIG. 4B illustrates an operation of a multiple phase mask when external light enters a display layer at a non-zero angle to a normal line of the display layer according to one or more embodiments.

FIG. 4B illustrates an operation of a multiple phase mask when external light enters a display layer at a non-zero angle to a normal line of the display layer according to one or more embodiments.

Referring to FIG. 4B, unlike FIG. 4A, light diffused through a first surface 421-1 may not be modulated in a second surface 421-2. A first portion 422-1 of the light diffused through the first surface 421-1 may enter the second surface 421-2. However, a second portion 422-2 of the light diffused through the first surface 421-1 may enter a second lens of a microlens (e.g., a microlens 412) adjacent to the microlens 411. Accordingly, the first portion 422-1 may be focused on a different position from the second portion 422-2. The first surface 421-1 and the second surface 421-2 of FIG. 4B may respectively correspond to the first lens 411-1 and the second lens 411-2 of the microlens 411 of FIG. 4A.

Figure 4C:
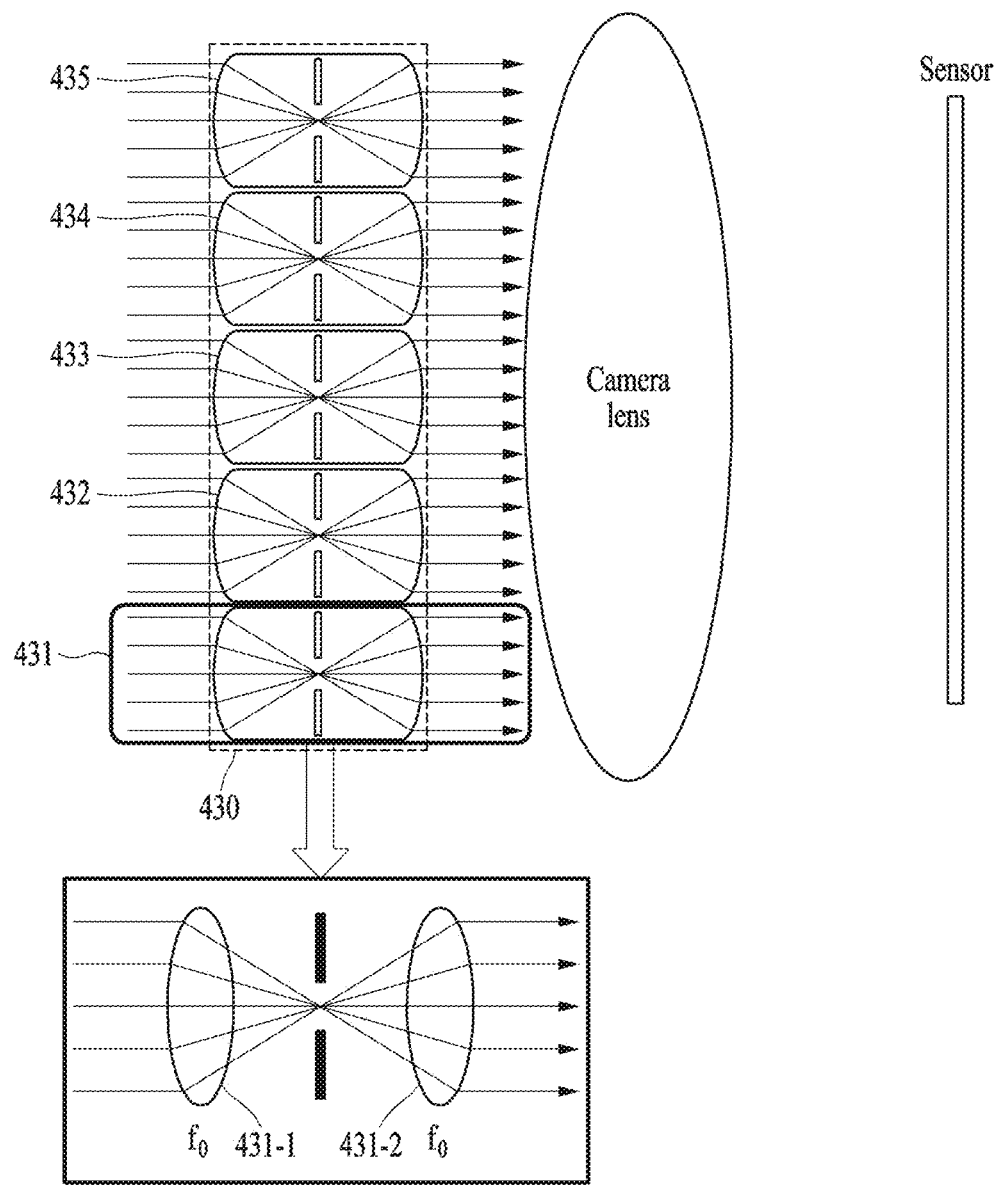
FIG. 4C illustrates an operation of a multiple phase mask when external light perpendicularly enters a display layer according to one or more embodiments.

FIG. 4C illustrates an operation of a multiple phase mask when external light perpendicularly enters a display layer according to one or more embodiments.

Referring to FIG. 4C, an MLA 430 may be used as a multi-phase mask. The MLA 430, according to one or more embodiments, may include a plurality of microlenses 431 to 435 arranged in the MLA 430, each of the microlenses 431 to 435 may function as a double-sided phase mask.

To describe based on the microlens 431, the microlens 431 may include a first lens 431-1 and a second lens 431-2. External light that is incident on the first lens 431-1 may converge in the hole areas and be diffused, and the diffused light may be incident on the second lens 431-2 and be refracted and modulated to correspond to the external light.

For example, the first lens 431-1 and the second lens 431-2 of the microlens 431 may both have a focal length of f0, and the first lens 431-1 may be disposed at a location a distance f0 from the front end of the display layer, and the second lens 431-2 may be disposed at a location a distance f0 from the rear end of the display layer. Further, the lens pitch (e.g., the distance between the microlenses) of the MLA 430 may be the same as the pixel pitch of the display layer.

However, when the MLA 430 is configured as shown in FIG. 4C, a user may not be able to see what is displayed on the display layer when the user's line of sight is perpendicular to the display layer. To prevent this, the image acquisition device of one or more embodiments may include and use a polarization-dependent phase mask with multiple phase masks. With a polarization-dependent phase mask, the under-display camera only operates in p-polarized light, and the display only operates in s-polarized light, such that the size of the hole area in the display layer may be optically expanded while still maintaining visibility. For example, either one or both of the first lens 431-1 and the second lens 431-2 may be or include a polarization-dependent phase mask.

Hereinafter, a detailed description of a problem that may occur when external light enters at an angle that is not "0" to the normal line of a display layer is provided with reference to FIGS. 5 to 6, and a detailed description for overcoming the problem according to one or more embodiments is provided with reference to FIGS. 7A to 9B.

In one or more embodiments, a blur shape of a raw image to be sensed through an image sensor may be simulated by a point spread function (PSF).

The PSF may mathematically or numerically express how one pixel area or a point to be included in the raw image diffuses. Blur information to be shown in the raw image may be estimated by the PSF. The PSF may be referred to as a blur kernel. The raw image may be expressed by adding noise to a convolution value of the blur kernel and an original image (e.g., an image before blur).

When an aperture function of the UDC is a(x), a profile of a first lens of a double-sided phase mask is $\phi_1(x)$, a profile of a second lens of the double-sided phase mask is $\phi_2(x)$, and the thickness of the double-sided phase mask is z, a forward direction process may be expressed by Equation 2 shown below, for example.

$$a(x) = \sum_{n=1}^{N} \Pi\left(\frac{x-nT}{D}\right)$$

$$\Phi_1(x) = \sum_{n=1}^{N} -\frac{(x-nT)^2}{2f_1}\Pi\left(\frac{x-nT}{D}\right)$$

$$\Phi_2(x) = \sum_{n=1}^{N} -\frac{(x-nT)^2}{2f_2}\Pi\left(\frac{x-nT}{T}\right)$$

Equation 2

In Equation 2, T may denote the size of a pixel of each display layer, D may denote the width of each hole, and N may denote the number of pixels of an aperture.

$$\Pi\left(\frac{x-nT}{D}\right)$$

may denote a box function having the width of D with nT as a center, and $f_1$ and $f_2$ may respectively denote a focal length of the first lens and a focal length of the second lens.

Considering a monochromatic plane wave of which a wavelength is $\lambda$ and an incident normal is $\alpha$, a wavefront immediately after the first lens may be expressed by Equation 3 below, for example.

$$u_{1+}(x;\lambda,\alpha) = u_{1-}(x;\lambda,\alpha)a(x)e^{j\frac{2\pi}{\lambda}\Phi_1(x)}.$$

Equation 3

A wavefront diffused by z may be expressed by Equation 4 below, for example.

$$u_{2-}(x;\lambda,\alpha) = \frac{1}{j\lambda z}e^{j\frac{k}{2z}x^2}\mathcal{F}_{\frac{1}{\lambda x}}\left(u_{1+}(x;\lambda,\alpha)e^{j\frac{k}{2z}x^2}\right).$$

Equation 4

Then, a wavefront modulated by the second lens may be expressed by Equation 5 below, for example.

$$u_{2+}(x;\lambda,\alpha) = u_{2-}(x;\lambda,\alpha)e^{j\frac{2\pi}{\lambda}\Phi_2(x)}.$$

Equation 5

A wavefront modulated by the second lens may be focused on a sensor and the PSF in this case may be expressed by Equation 6 below, for example.

$$k(x;\lambda,\alpha) = \left|\frac{1}{j\lambda z}\mathcal{F}\left(u_{2+}\left(\frac{x}{\lambda f};\lambda,\alpha\right)\right)\right|^2$$

Equation 6

A PSF measured in a wideband light source may be a weighted integral of all PSFs at each wavelength having a spectral sensitivity of a corresponding sensor, and may be expressed by Equation 7 below, for example.

$$k(x;\alpha) = \int_\lambda k(x;\lambda,\alpha)w(\lambda)d\lambda.$$

Equation 7

Figure 5:
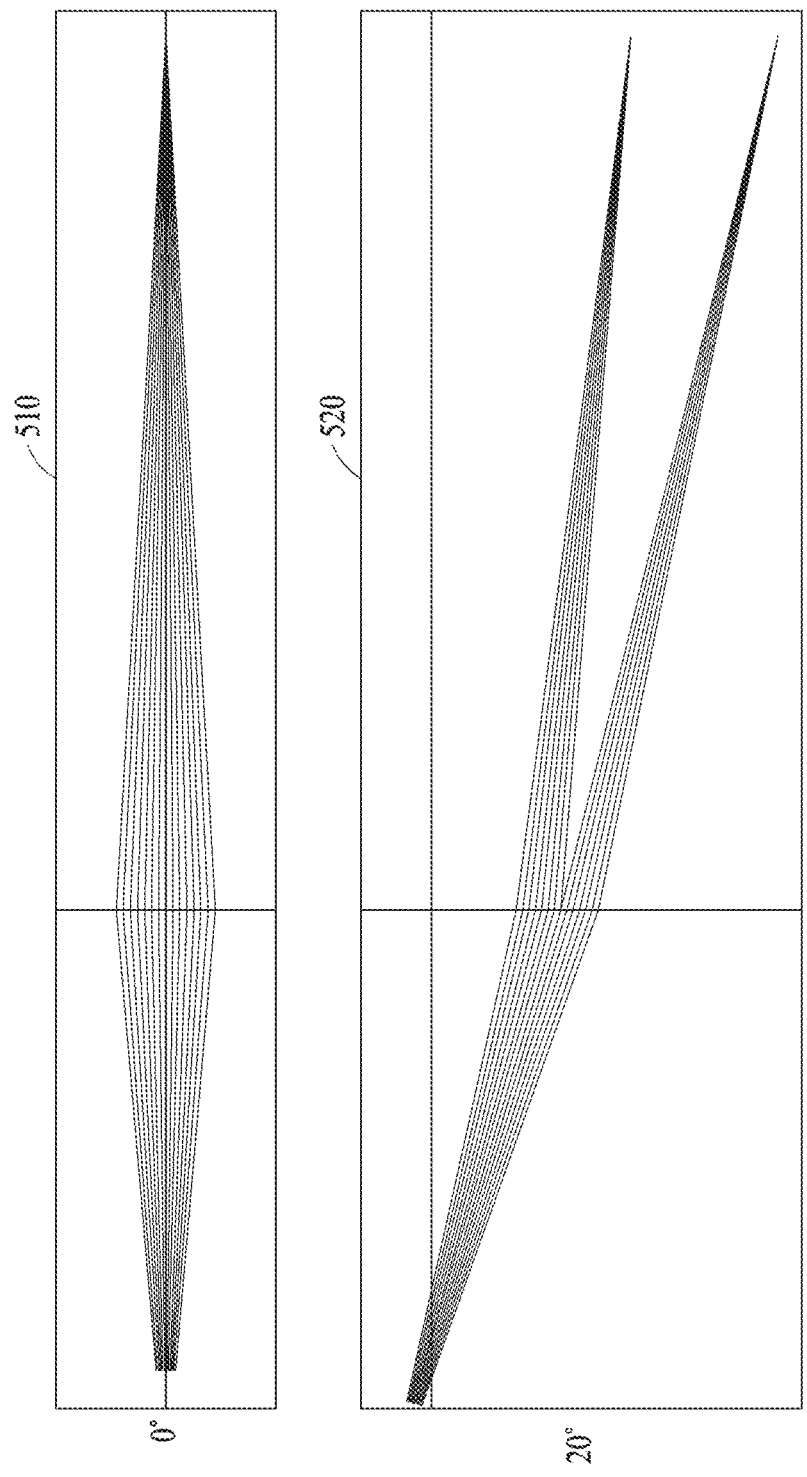
FIGS. 5 and 6 illustrate two characteristics of a blur kernel according to one or more embodiments.
Figure 6:
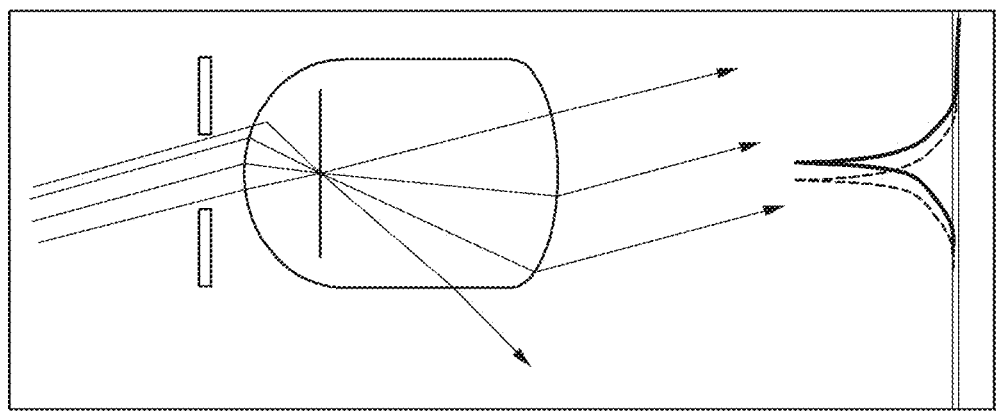

FIGS. 5 and 6 illustrate two characteristics of a blur kernel according to one or more embodiments.

Referring to FIG. 5, a PSF according to one or more embodiments may have a characteristic of spatially varying depending on the incident angle of light, and the phenomenon may be referred to as spatial-varying.

A diagram 510 illustrates an operation of a double-sided phase mask when external light perpendicularly enters a display layer. The first lens of the microlens may diffuse the diameter of external light that has passed the hole areas by a predetermined value (e.g., 5 times) and the second lens of the microlens may concentrate the light diffused through the first lens in the focus on a sensor.

A diagram 520 illustrates an operation of the double-sided phase mask when external light does not perpendicularly enter the display layer (e.g., when the external light enters the display layer at an angle of 20 degrees to a normal line of the display layer).

The light diffused through the first lens may not enter the second lens of the same microlens and may enter second lenses of microlenses adjacent to the microlens, including the first lens. Accordingly, the second lenses may form a plurality (e.g., two) of focuses in the sensor, and thus, the sensor may obtain a raw image with degraded image quality compared to when the external light perpendicularly enters the display layer.

Referring to FIG. 6, a result of diffraction according to one or more embodiments may generate a PSF that spreads at a position in a sensor, that varies depending on a wavelength of incident light, and the phenomenon may be referred to as chromatic shifting.

When each sensor pixel is sensitive to broad-spectrum light and a measured PSF is a weighted sum of PSFs generated at various wavelengths, chromatic shifting may degrade the image quality.

A parameter setting method of one or more embodiments may improve the performance of the multiple phase mask by minimizing spatial-varying and chromatic shifting. Hereinafter, a description of a parameter setting method for minimizing spatial-varying and chromatic shifting is provided with reference to FIGS. 7A to 7C.

Figure 7A:
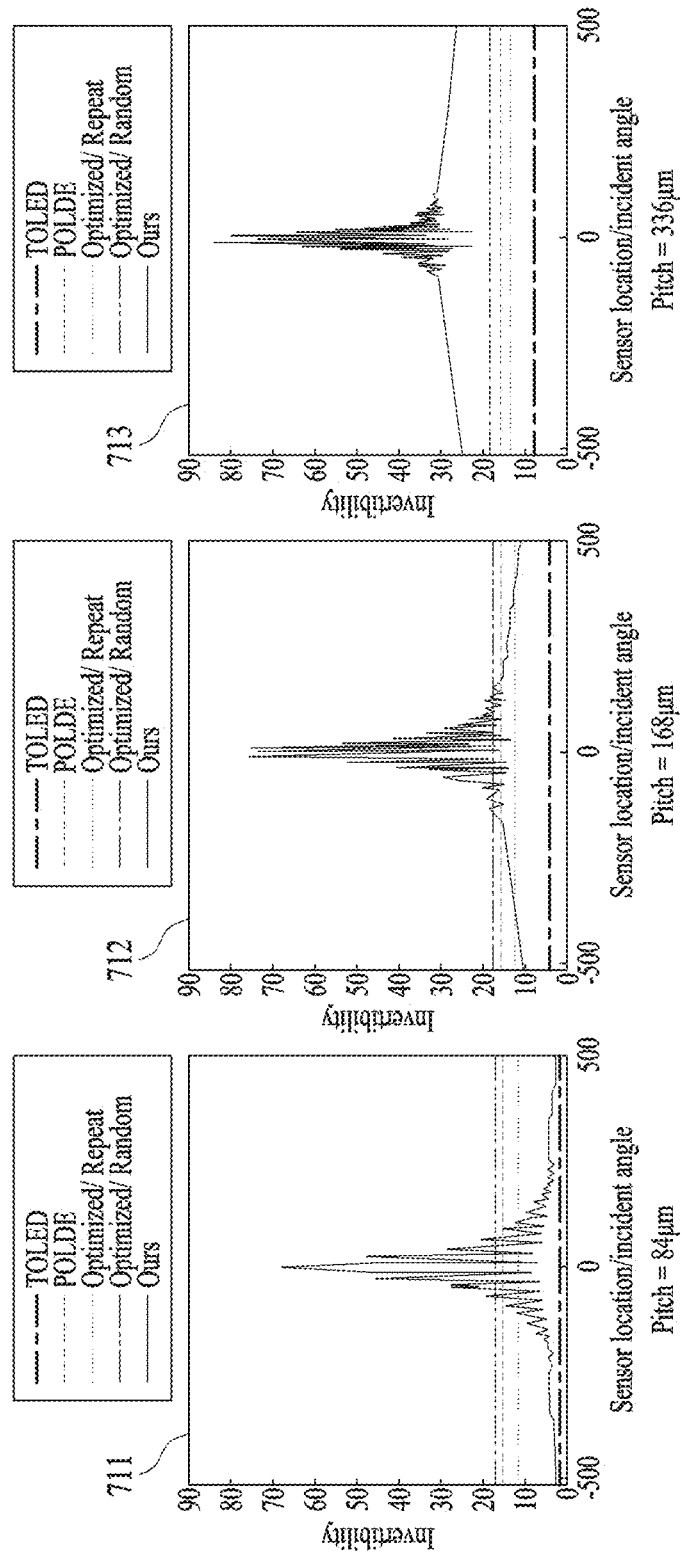
FIGS. 7A to 7C illustrate a parameter setting method for minimizing spatial-varying and chromatic shifting.
Figure 7B:
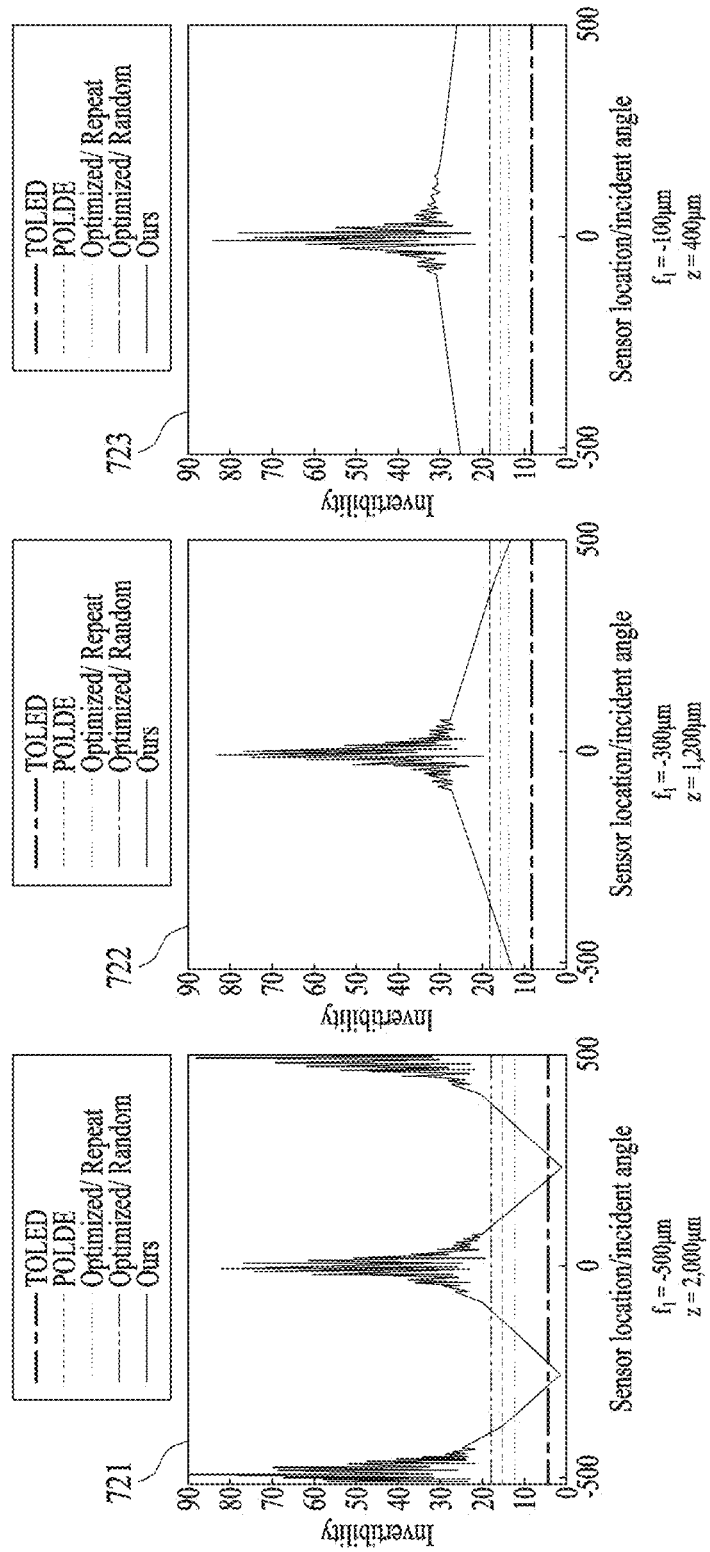
Figure 7C:
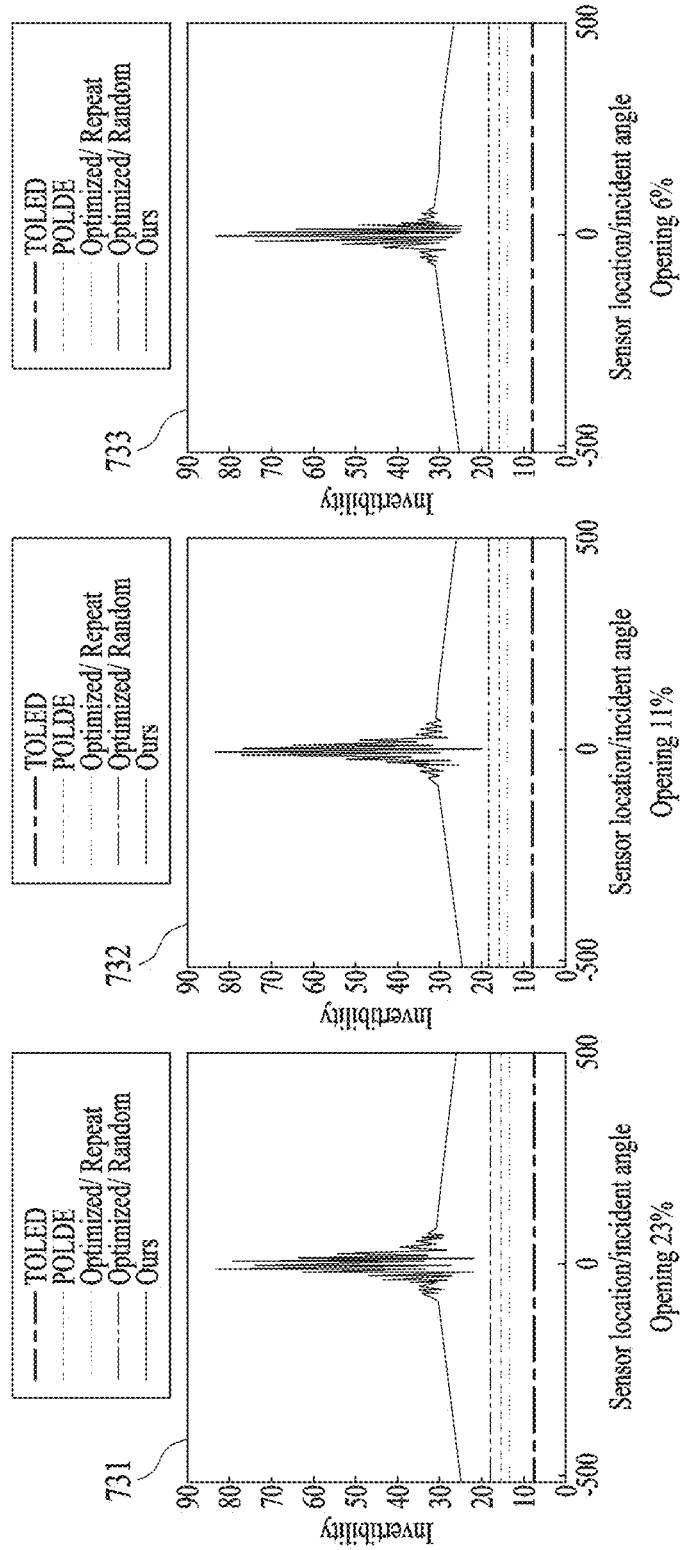

FIGS. 7A to 7C illustrate a parameter setting method for minimizing spatial-varying and chromatic shifting.

Referring to FIG. 7A, when a pixel pitch of a display layer increases, invertibility of a raw image may increase. Diagrams 711, 712, and 713 are graphs illustrating invertibility based on a sensor position (or an incident angle) when a pixel pitch of a display layer is 85 μm, 168 μm, 336 μm, respectively. Referring to the diagrams 711, 712, and 713, it may be identified that when the pixel pitch increases, invertibility of the raw image also increases.

Referring to FIG. 7B, when the thickness of a multiple phase mask decreases, invertibility of the raw image may increase. Diagrams 721, 722, and 723 are graphs illustrating invertibility based on a sensor position (or an incident angle) when (1 focal length, thickness) is (−500 μm, 2000 μm), (−300 μm, 1200 μm), (−100 μm, 400 μm), respectively. Referring to the diagrams 721, 722, and 723, it may be identified that when the thickness of the multiple phase mask decreases, invertibility of a raw image increases because of less influence of photometry.

Referring to FIG. 7C, an open ratio of the display layer may not affect invertibility of the raw image. Diagrams 731, 732, and 733 are graphs illustrating invertibility depending on a sensor position (or an incident angle) when an open ratio of a display layer is 23%, 11%, and 6%, respectively. Referring to the diagrams 731, 732, and 733, it may identify that the open ratio of the display layer may not affect invertibility of the raw image.

Referring to FIGS. 7A to 7C, for constructing a multiple phase mask when a pixel pitch of the display layer is determined (e.g., 84 μm for a smartphone), invertibility of the raw image may increase when an increase in a lens pitch of the multiple phase mask and a decrease in the thickness of the multiple phase mask, because as the lens pitch decreases, diffraction increases.

Figure 8:
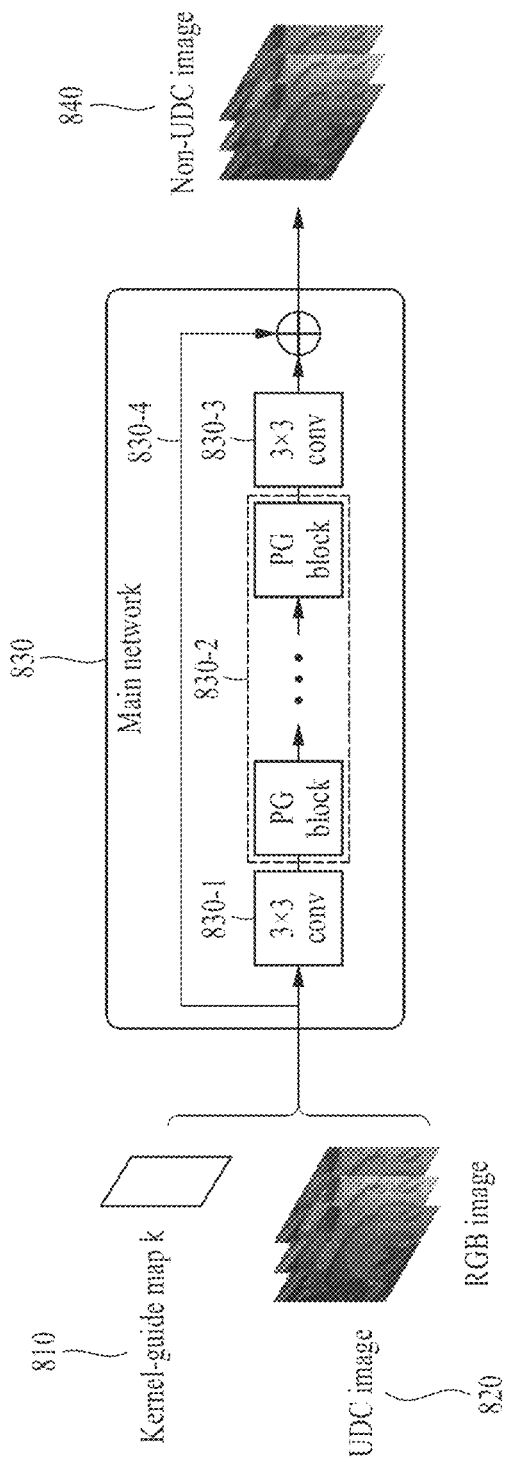
FIG. 8 illustrates a method of performing image processing on a raw image based on blur information corresponding to the raw image, according to one or more embodiments.

FIG. 8 illustrates a method of performing image processing on a raw image, based on blur information corresponding to the raw image, according to one or more embodiments.

The blur information may be extracted from an arrangement of hole areas arranged in a display layer. The blur information may depend on any one or any combination of any two or more of a size, a shape, a depth, and an arrangement of the hole areas, and the blur information may be determined using a PSF determined by simulation or an equation.

A processor according to one or more embodiments may obtain an image 840 with reduced blur or reduced double image by performing image processing on a raw image 820 based on blur information 810 (e.g., a kernel-guide map) for each pixel of an image sensor. For this, the processor may obtain the image 840 enhanced using a neural network-based image restoration model 830.

The neural network-based image restoration model 830 may receive data obtained by concatenating the raw image 820 and the blur information 810 for each pixel and may output the enhanced image 840.

The neural network-based image restoration model 830 may include a first convolutional layer 830-1, a plurality of pixel-wise guided (PG) blocks 830-2, a second convolutional layer 830-3, and a residual connector 830-4 configured to connect an input to the neural network-based image restoration model 830 to an output of the neural network-based image restoration model 830.

The PG blocks 830-2 may be a type of an attention block and may improve the performance of the neural network-based image restoration model 830 by using a kernel-guide map generated based on the blur information for each pixel. An example description of the kernel-guide map is provided below with reference to FIG. 9.

Figure 9:
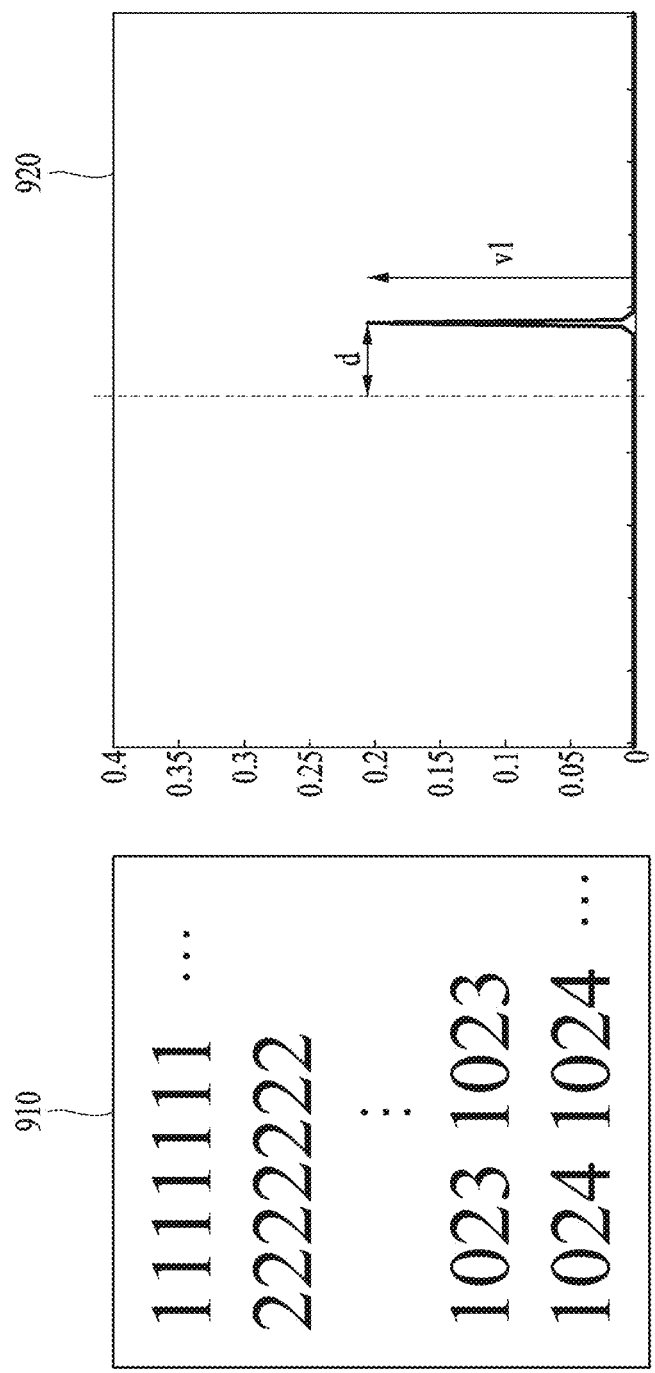
FIG. 9 illustrates a kernel-guide map according to one or more embodiments.

FIG. 9 illustrates a kernel-guide map according to one or more embodiments.

According to chromatic shifting, a result of diffraction may generate a PSF that spreads at a position, in a sensor, that varies depending on a wavelength of incident light, and thus, image quality may be degraded.

To solve this problem, a processor according to one or more embodiments may use the blur information for each pixel for training and inferring the neural network-based image restoration model.

The blur information for each pixel may include either one or both of position information of a main lobe of a PSF corresponding to each pixel of an image sensor and an intensity of the main lobe.

For example, the processor may use a kernel-guide map generated based on the blur information for each pixel for training and inferring the neural network-based image restoration model.

Each pixel of the sensor may have a PSF. In this case, pixels may have different PSFs depending on a first axis (e.g., the y-axis). Pixels on a same second axis (e.g., the x-axis) may have the same PSF, however, pixels on different positions on the first axis (e.g., the y-axis) may have different PSFs.

For example, pixels on different positions on the first axis (e.g., the y-axis) may have different intensities and positions of main lobes of the PSFs. By using this for training and inferring the neural network-based image restoration model, the processor according to one or more embodiments may alleviate image quality degradation due to chromatic shifting.

Pixels on the second axis (e.g., the x-axis) may have the same PSF, however, pixels on different positions on the first axis (e.g., the y-axis) may have different PSFs.

Numbers displayed on a kernel-guide map 910 according to one or more embodiments may represent an address (or index) of each pixel of the sensor. It may be identified that pixels on the same second axis (e.g., the x-axis) may have the same address, however, pixels on different positions on the first axis (e.g., the y-axis) may have different addresses.

A kernel-guide map 920 according to one or more embodiments may include a position (e.g., d: a distance between the center and a main lobe) of a main lobe of a PSF of a pixel and an intensity of the main lobe.

Figure 10:
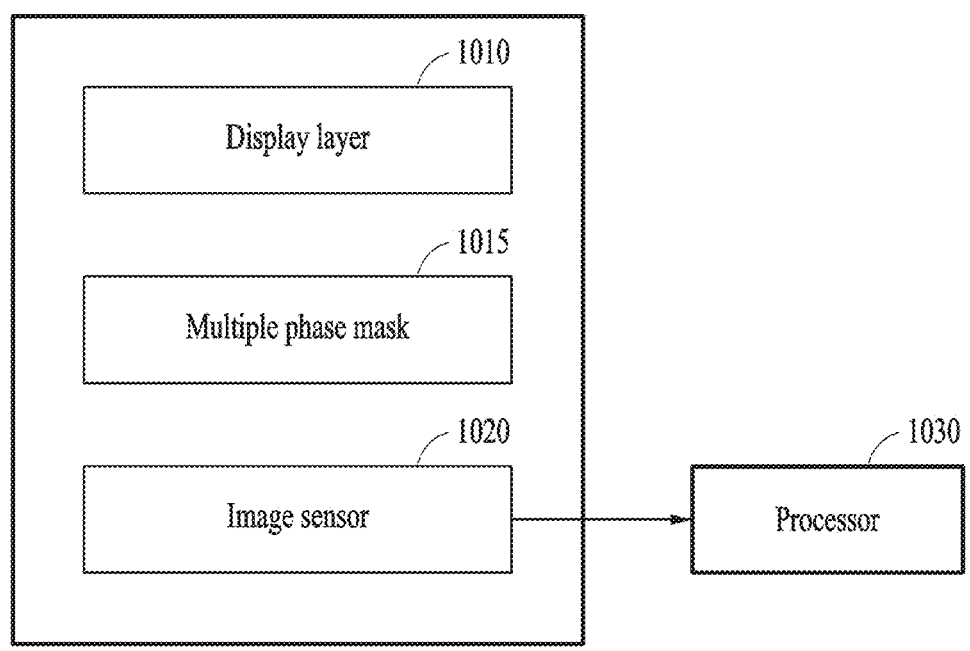
FIG. 10 illustrates a configuration of an image acquisition device according to one or more embodiments.

FIG. 10 illustrates a configuration of an image acquisition device according to one or more embodiments.

Referring to FIG. 10, an image acquisition device 1000 may include a display layer 1010, a multiple phase mask 1015, an image sensor 1020, and a processor 1030 (e.g., one or more processors). The display layer 1010 may include hole areas through which external light passes and a pixel area between the hole areas. The hole areas and the pixel areas may be alternately disposed on the display layer 1010 and each of the hole areas may have a single circular shape and may have a larger area than each of the pixel areas. In one or more embodiments, the hole areas may have the same shape and the same size and may be distinguished from each other based on a wiring area. The image acquisition device 1000 may be or include the electronic device 110 of FIG. 1, as a non-limiting example.

The multiple phase mask 1015 may be under the display layer 1010 and may modulate external light that has passed hole areas 1040.

The image sensor 1020 may be under the multiple phase mask 1015 and may generate a raw image by sensing modulated light 270 of FIG. 2A that has passed through the multiple phase mask 215. The image sensor 1020 may include a camera configured to generate image data by receiving the external light. The image sensor 1020 may transmit the generated raw image to the processor 1030.

The processor 1030 may control an overall operation of the image acquisition device 1000 and may execute instructions to execute one or more operations performed by the image acquisition device described with reference to FIGS. 1 to 9. For example, the processor 1030 may generate an enhanced image by performing image processing on the raw image, based on blur information corresponding to the raw image. The blur information may include information on blur of the raw image determined based on the size, shape, and arrangement of the hole areas on the display layer 1010. For example, the blur information may include information on a PSF based on an arrangement structure of the hole areas. The processor may obtain an enhanced image using a neural network-based image restoration model. The processor 1030 may perform any one, any combination, or all of the operations and methods described herein with references to FIGS. 1 to 9 and 11.

Figure 11:
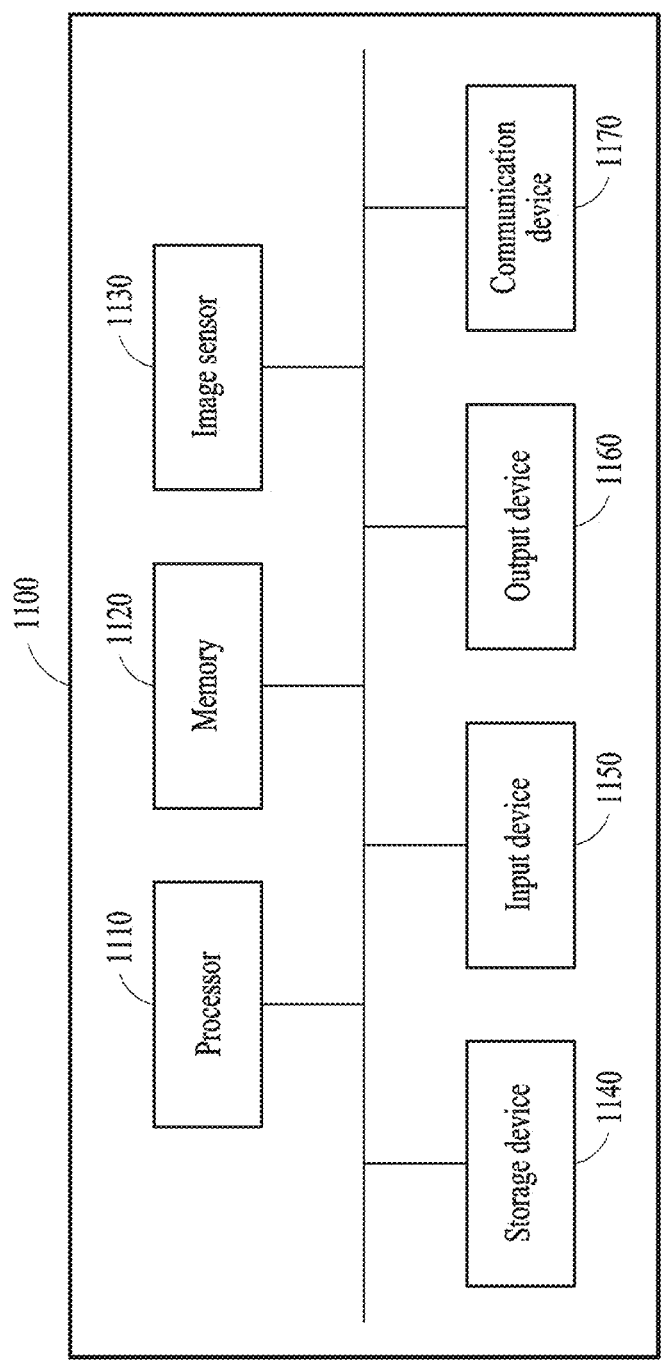
FIG. 11 illustrates a configuration of an electronic device according to one or more embodiments.

FIG. 11 illustrates a configuration of an electronic device according to one or more embodiments.

Referring to FIG. 11, an electronic device 1100 may be a device including a display (e.g., a display of an output device 1160), and may be, for example, a smartphone, a tablet computer, a wearable device, a netbook, and/or a laptop. The electronic device 1100 may include a processor 1110 (e.g., one or more processors), a memory 1120 (e.g., one or more memories), an image sensor 1130, a storage device 1140, an input device 1150, the output device 1160, and a communication device 1170. Each component of the electronic device 1100 may communicate with each other via a communication bus 1180. The electronic device 1100 may perform all functions of the image acquisition device 1000 of FIG. 10. The electronic device 1100 may be or include either one or both of the electronic device 110 of FIG. 1 and the image acquisition device 1000 of FIG. 10, as non-limiting examples.

The processor 1110 may control an overall operation of the electronic device 1100 and may execute functions and instructions to be executed within the electronic device 1100. The processor 1110 may perform any one, any combination, or all of the operations and methods described herein with references to FIGS. 1 to 10. The processor 1110 may generate an enhanced image by performing image processing on a raw image obtain by the image sensor 1130. For example, the processor 1110 may generate an enhanced image by performing image preprocessing and image restoration on a raw image, based on blur information corresponding to the raw image.

The memory 1120 may store information necessary for the processor 1110 to perform a processing operation. For example, the memory 1120 may store instructions to be executed by the processor 1110 and may store related information while a software or a program is executed in the electronic device 1100. The memory 1120 may include random-access memory (RAM), dynamic random-access memory (DRAM), static random-access memory (SRAM), or another type of non-volatile memory known in the art. The memory 1120 may be or include a non-transitory computer-readable storage medium storing instructions that, when executed by the processor 1110, configure the processor 1110 to perform any one, any combination, or all of the operations and methods described herein with references to FIGS. 1 to 10.

The image sensor 1130 may be arranged under a multiple phase mask and may generate a raw image by sensing modulated light that has passed through the multiple phase mask. The image sensor 1130 may include a camera configured to receive external light and may perform image processing on a raw image according to one or more embodiments.

The storage device 1140 may include a computer-readable storage medium or a computer-readable storage device and may store a raw image and an enhanced image. For example, the storage device 1140 may include a magnetic hard disk, an optical disk, flash memory, and electrically programmable read-only memory (EPROM).

The input device 1150 may receive an input from a user through a haptic, video, audio, or touch input. For example, the input device 1150 may include a keyboard, a mouse, a touch screen, a microphone, a retina scanner, or any other device that detects the input from the user and transmits the detected input to the electronic device 1100.

The output device 1160 may provide an output of the electronic device 1100 to the user through a visual, auditory, or haptic channel. The output device 1160 may include, for example, a liquid crystal display, a display panel for a light-emitting diode (LED)/organic LED (OLED) display, a touch screen, a speaker, a vibration generator, or any other device that provides the output to the user. The display panel may include a display layer where hole areas through which external light passes and pixel areas configured to output a display image are arranged.

The communication device 1170 may communicate with an external device through a wired or wireless network. The communication device 1170 may transmit/receive data or information to/from an external device.

Figure 12:
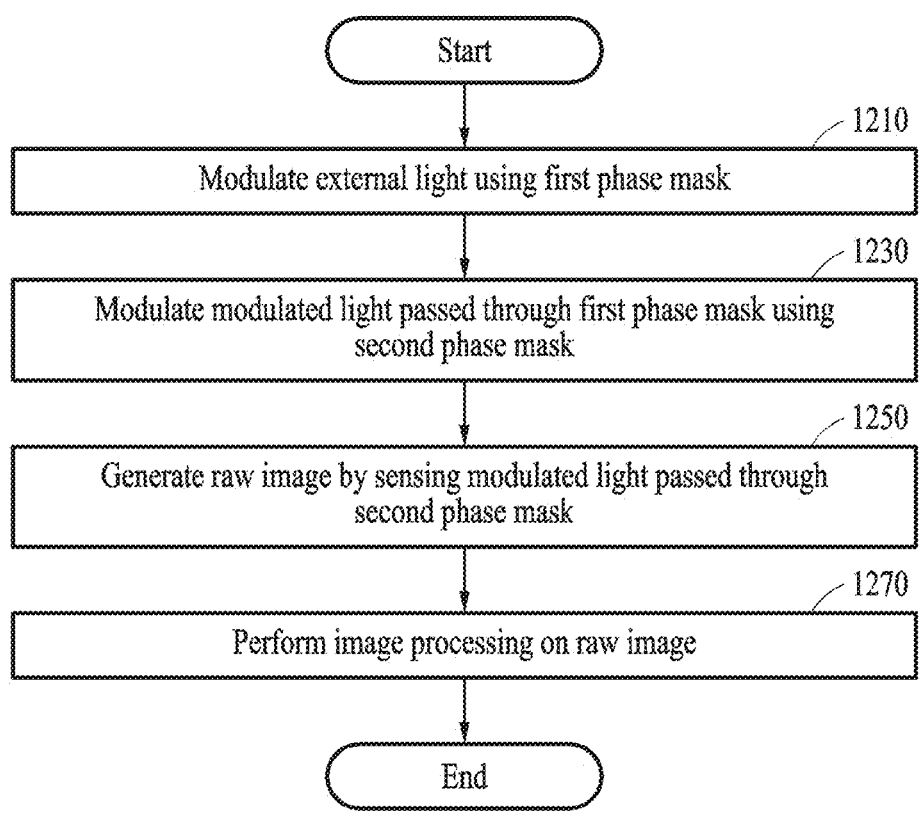
FIG. 12 illustrates an operation of an image acquisition device according to one or more embodiments.

FIG. 12 illustrates an operation of an image acquisition device according to one or more embodiments. Some of operations of FIG. 12 may be performed simultaneously or in parallel to another operation and the order of operations may change. In addition, some of the operations may be omitted or another operation may be additionally performed.

In operation 1210, an image acquisition device (e.g., the image acquisition device 1000 of FIG. 10) may modulate, using a first phase mask disposed at a front end of a display layer, an external light.

In operation 1230, the image acquisition device may modulate, using a second phase mask disposed at a rear end of the display layer, the modulated light that has passed through the first phase mask.

In operation 1250, the image acquisition device may generate, using an image sensor disposed at a rear end of the second phase mask, a raw image by sensing the modulated light that has passed through the second phase mask.

In operation 1270, the image acquisition device may perform, using a processor, image processing on the raw image, based on blur information corresponding to the raw image.

The electronic devices, displays, areas, display layers, pixel areas, hole areas, display layers, multiple phase masks, image sensors, protective layers, MLAs, microlenses, first lenses, second lenses, first surfaces, second surfaces, image acquisition devices, display layers, processors, memories, storage devices, input devices, output devices, communication devices, electronic device 110, display 120, area 130, display layer 140, pixel areas 150, hole areas 160, display layer 210, multiple phase mask 215, image sensor 220, pixel areas 230, hole areas 240, protective layer 260, MLA 410, microlenses 411 to 415, first lens 411-1, second lens 411-2, first surface 421-1, second surface 421-2, image acquisition device 1000, display layer 1010, multiple phase mask 1015, image sensor 1020, processor 1030, electronic device 1100, processor 1110, memory 1120, image sensor 1130, storage device 1140, input device 1150, output device 1160, communication device 1170, and other apparatuses, units, modules, devices, and components described herein with respect to FIGS. 1-11 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A device with image acquisition, the device comprising:
   a first phase mask disposed above a display layer, where the first phase mask includes a first optical element configured to modulate external light;

the display layer comprising pixel areas between hole areas through which the modulated light passes, the pixel areas being configured to output a display image;

a second phase mask disposed below the display layer, where the second phase mask includes a second optical element configured to further modulate the modulated external light that is incident from the display layer after having passed through the first the hole areas;

an image sensor disposed below the second phase mask and configured to generate a raw image by sensing the further modulated external light; and a processor configured to perform image processing on the raw image, based on blur information corresponding to the raw image.

2. The device of claim 1, wherein for the modulating of the external light, the first phase mask is configured to modulate the external light to converge toward the hole areas, and then the modulated external light is diffused, as diffused light, in the hole areas, and for the further modulating of the modulated external light, the second phase mask is configured to modulate the diffused light to correspond to the external light.

3. The device of claim 2, wherein the second phase mask is configured to modulate the diffused light to a plane wave to correspond to a plane wave of the external light before the modulation of the external light by the first phase mask.

4. The device of claim 1, wherein the first phase mask and the second phase mask have a same focal length, the first phase mask is disposed at a position above the display layer by the focal distance, and the second phase mask is disposed below the display layer by the focal distance.

5. The device of claim 1, wherein the first optical element and the second optical element are respective microlens arrays.

6. The device of claim 1, wherein either one or both of the first phase mask and the second phase mask is a respective polarization dependent phase mask.

7. The device of claim 1, wherein the first optical element includes a plurality of first microlenses arranged according to a first height profile that includes different heights, and/or the second optical element includes a plurality of second microlenses arranged according to a second height profile that includes different heights.

8. The device of claim 1, wherein invertibility of the raw image is determined dependent on any one or any combination of any two or more of a pixel pitch of the display layer, a distance between the first phase mask and the second phase mask, and a lens pitch of the first phase mask and the second phase mask.

9. The device of claim 8, wherein the invertibility of the raw image is configured to increase in response to any one or any combination of any two or more of an increase in the pixel pitch of the display layer, a decrease in the distance between the first phase mask and the second phase mask, and an increase in the lens pitch of the first phase mask and the second phase mask.

10. The device of claim 1, wherein the processor is configured to perform the image processing on the raw image based on blur information for each pixel of the image sensor, where the blur information is dependent on a characteristic of the hole areas.

11. The device of claim 10, wherein the blur information for each pixel comprises either one or both of position information of a main lobe of a point spread function (PSF) corresponding to each pixel of the image sensor and an intensity of the main lobe.

12. The device of claim 10, wherein for the performing of the image processing, the processor is configured to generate an enhanced image using an image restoration model based on a neural network, and the image restoration model is configured to receive data determined by concatenating the raw image and the blur information for each pixel.

13. The device of claim 12, wherein the image restoration model comprises an attention block, and for the obtaining of the enhanced image, the processor is configured to use a kernel-guide map generated based on the blur information for each pixel as the attention block.

14. The device of claim 10, wherein the blur information comprises information on blur of the raw image determined based on any one or any combination of any two or more of a size, a shape, a depth, and an arrangement of the hole areas.

15. The device of claim 10, wherein the blur information comprises information on a point spread function (PSF) based on an arrangement structure of the hole areas.

16. A device with image acquisition, the device comprising:

a display layer comprising hole areas, through which external light passes, and pixel areas between the hole areas, the pixel areas being configured to output a display image;

a multiple phase mask under the display layer, where the multiple phase mask includes at least a first optical element that is configured to diffuse the external light that is incident from the display layer after having passed through the hole areas, and a second optical element that is configured to modulate the diffused external light to correspond to the external light; and an image sensor under the multiple phase mask and configured to generate a raw image by sensing modulated diffused external light.

17. The device of claim 16, wherein, for the modulating of the diffused external light, the second optical element is configured to modulate the diffused external light to a plane wave to correspond to a plane wave of the external light before incident on the display layer.

18. The device of claim 16, wherein invertibility of the raw image is determined based on any one or any combination of any two or more of a pixel pitch of the display layer, a thickness of the multiple phase mask, and a lens pitch of the multiple phase mask.

19. A system with image acquisition, the system comprising:

a first phase mask disposed above a display layer that is configured to output a display image, where the first phase mask includes a first optical element configured to modulate external light;

a second phase mask disposed below the display layer, where the second phase mask includes a second optical element configured to further modulate, as further modulated external light, the modulated external light that is incident from the display layer after having passed through the display layer; and an image sensor disposed below the second phase mask and configured to generate a raw image by sensing the further modulated external light.

20. A method with image acquisition, the method comprising:
- phase mask modulating an external light before the external light is incident on a display layer that is configured to output a display image;
- further phase mask modulating, as further a modulated external light, the modulated external light that is incident from the display layer after having passed through the display layer;
- generating, using an image sensor, a raw image by sensing the further modulated external light; and
- performing, using a processor, image processing on the raw image, based on blur information corresponding to the raw image.

21. The method of claim 20, wherein
- the phase mask modulating of the external light comprises phase mask modulating the external light to converges toward a hole area of the display layer, and then the modulated external light is diffused, as diffused light, in the hole area of the display layer, and
- the further phase mask modulating of the modulated external light comprises phase mask modulating the diffused light to correspond to the external light.

22. A non-transitory computer-readable storage medium storing instructions that, when executed by a processor, configure the processor to perform the generating of the raw image and the performing of the image processing of claim 20.

23. A device with image acquisition, the device comprising:
- a display layer comprising hole areas, through which external light passes, and pixel areas between the hole areas, where the pixel areas are configured to output a display image;
- a multiple phase mask under the display layer, where the multiple phase mask includes at least a first optical element that is configured to diffuse the external light that is incident from the display layer after having passed through the hole areas, and a second optical element that is configured to modulate the diffused external light;
- an image sensor under the multiple phase mask and configured to generate a raw image by sensing the modulated diffused external light; and
- a processor configured to perform image processing on the raw image, based on blur information corresponding to the raw image.

24. The device of claim 1, wherein the further modulation of the modulated external light optically expands a size of the hole areas.

25. The device of claim 7, wherein the first height profile and/or the second height profile are determined based on each of a plurality of pixels of the pixel areas.

26. The device of claim 16, wherein the first optical element and the second optical element are respective microlenses of a double-sided microlens array.

27. The device of claim 18, wherein the invertibility of the raw image is configured to increase in response to any one or any combination of any two or more of an increase in the pixel pitch of the display layer, a decrease in the thickness of the multiple second phase mask, and an increase in the lens pitch of the multiple phase mask.

28. The device of claim 23, wherein the second optical element is configured to modulate the diffused external light into a plane wave to correspond to a plane wave of the external light before being incident on the display layer.

29. The device of claim 23, wherein the image processing on the raw image includes blur reduction based on the blur information.

* * * * *